March 8, 1955     P. D. BECKER     2,703,742
FURNITURE ASSEMBLY AND FASTENING DEVICE FOR USE THEREIN
Filed Oct. 9, 1952     2 Sheets-Sheet 1
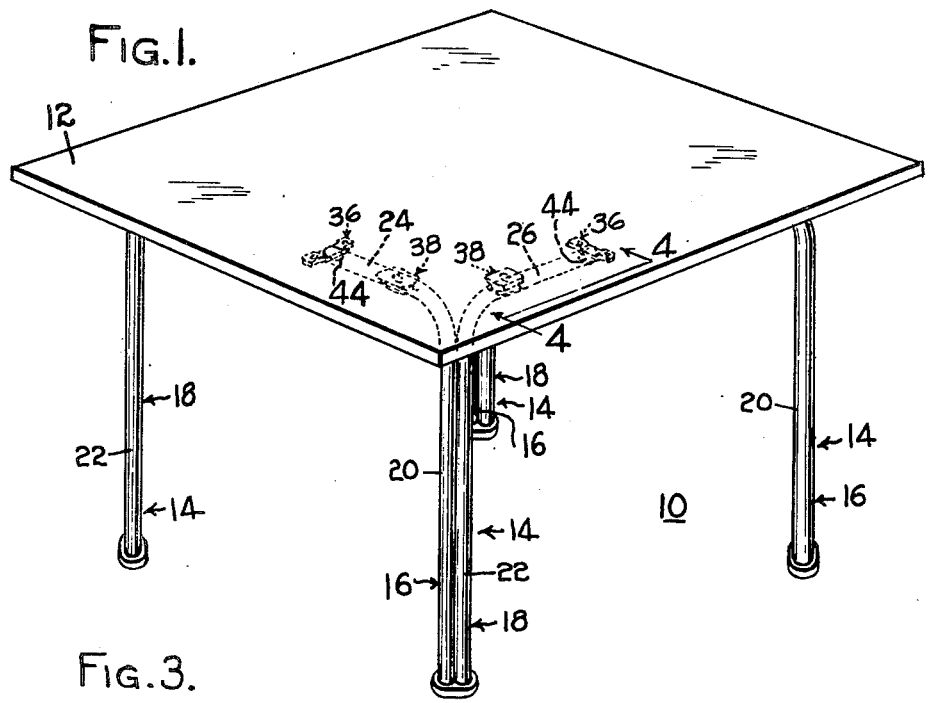
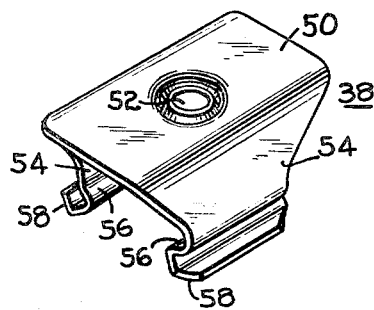
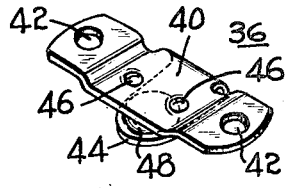
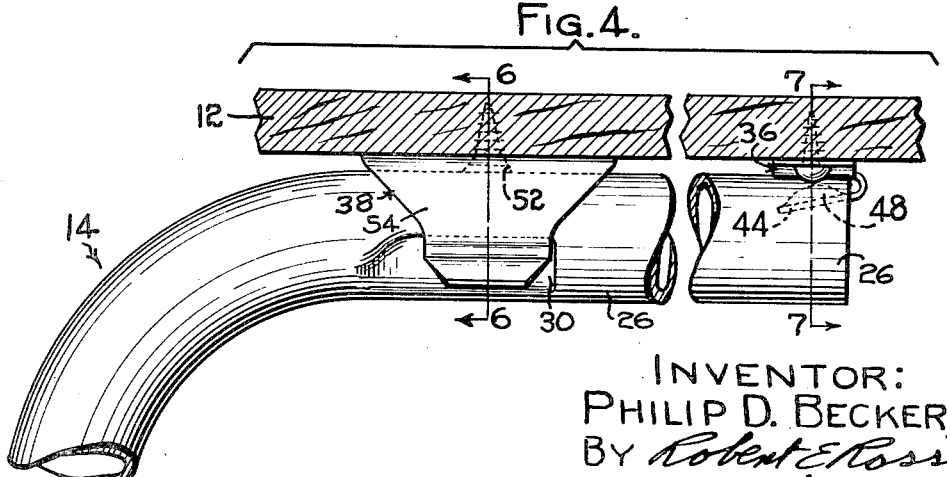
INVENTOR:
PHILIP D. BECKER,
BY Robert E Ross
ATTORNEY.

March 8, 1955 P. D. BECKER 2,703,742
FURNITURE ASSEMBLY AND FASTENING DEVICE FOR USE THEREIN
Filed Oct. 9, 1952 2 Sheets-Sheet 2
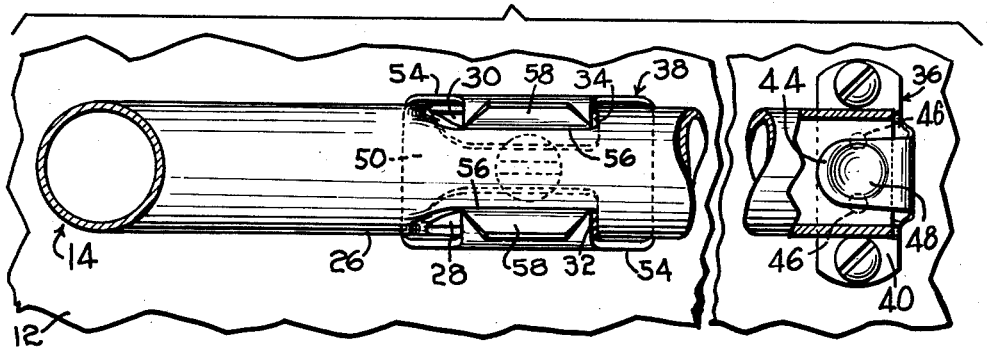
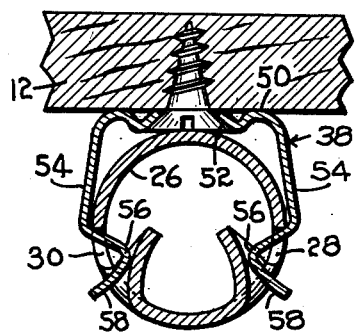
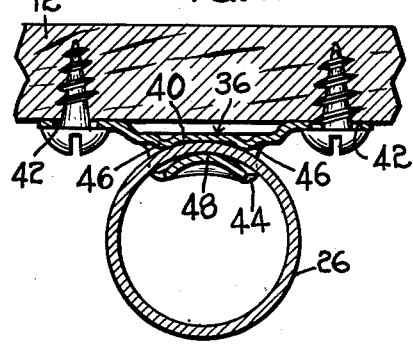
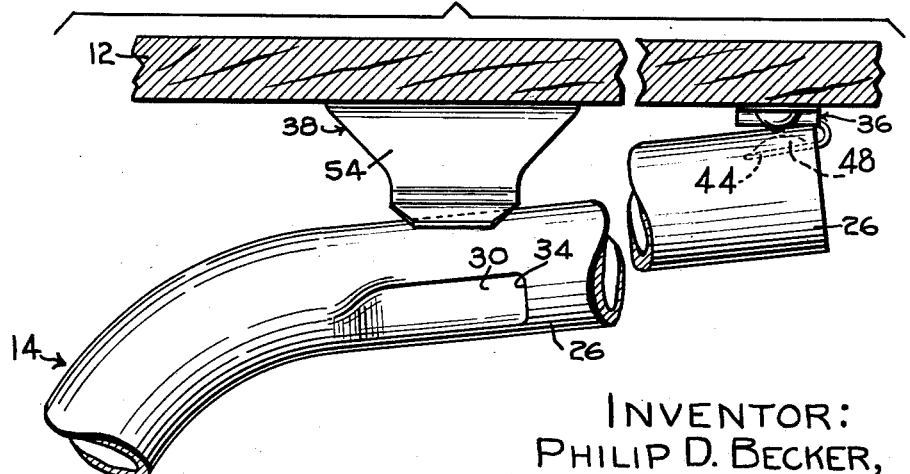
INVENTOR:
PHILIP D. BECKER,
BY Robert E Ross
ATTORNEY.

United States Patent Office 2,703,742
Patented Mar. 8, 1955

2,703,742

FURNITURE ASSEMBLY AND FASTENING DEVICE FOR USE THEREIN

Philip D. Becker, Hingham, Mass., assignor to United-Carr Fastener Corporation, Cambridge, Mass., a corporation of Massachusetts Application October 9, 1952, Serial No. 313,901

2 Claims. (Cl. 311—112)

This invention relates generally to furniture assemblies, and has particular reference to the assembly of legs of tubular material onto tables and the like, and to fastening devices for use in such assemblies.

In the construction of tables and the like utilizing legs formed of tubular steel, the legs are ordinarily attached to the table top by means of bolts or screws. However, this method is not entirely satisfactory, since it is desirable to ship such tables in the disassembled condition, to be assembled by the purchaser. For this reason, it would be desirable to make the assembly operation as simple and easy as possible.

The object of the invention is to provide a table assembly in which the leg members are adapted to be assembled into snapping engagement onto the lower side of the table top.

A further object of the invention is to provide a table assembly in which fastener means is provided on the under side of the top portion to enter the end of the tubular leg and other means is provided to receive a portion of the leg spaced therefrom in snapping engagement.

A still further object of the invention is to provide fastener means for use in a table assembly, which comprises a first fastener member for entering the end of a tubular leg, and other fastener means for embracing a portion of the leg spaced from the end in snapping engagement.

Other objects of the invention will, in part, be obvious, and will, in part, appear hereinafter.

In the drawing:

Fig. 1 is a perspective view of a table assembly embodying the features of the invention.

Fig. 2 is a perspective view of a fastening device for use in the assembly of Fig. 1.

Fig. 3 is a perspective view of a fastening device for use in the assembly of Fig. 1.

Fig. 4 is a view in section taken on line 4—4 of Fig. 1.

Fig. 5 is a bottom plan view of the assembly of Fig. 4.

Fig. 6 is a view in section taken on line 6—6 of Fig. 4.

Fig. 7 is a view in section taken on line 7—7 of Fig. 4.

Fig. 8 is a view in elevation similar to Fig. 4 illustrating the method of assembly of the leg portions onto the table top.

Referring to the drawing, there is illustrated a table assembly 10, which comprises a top portion 12 and a plurality of supporting legs 14.

The legs 14 each comprise a pair of tubular members 16 and 18 which have substantially vertical collateral portions 20 and 22 and substantially horizontal table top support portions 24 and 26 bent to extend at substantially right angles to the collateral portions. The collateral portions 20 and 22 may be secured together by bolts, by welding, or by snap fastener means in such a manner that the support portions 24 and 26 extend at substantially right angles to each other in the same plane, so that when assembled onto the lower side of the table top, the support portions extend from a point near a corner along adjacent sides thereof.

The horizontal portions 24 and 26 are each provided with a pair of elongated apertures 28 and 30 respectively, and the apertures of each pair are disposed on opposite sides of the horizontal portion in spaced relation to the end thereof. In the illustrated embodiment, the apertures are formed by punching the sides of the tubes inwardly so that abrupt shoulders or edges 32 and 34 are provided at the ends of the pairs of apertures 28 and 30 respectively nearest the ends of the horizontal portions.

To permit assembly of the legs 14 onto the table top 12, a pair of fasteners 36 and 38 are provided for each support portion of the legs. The fastening device 36 comprises a base 40 having apertures 42 to enable it to be attached to the lower side of the table top by means of screws or the like, and a resilient hook-like arm 44 extending under the base from one side thereof. To facilitate assembly of the support portion of the leg as will be described hereinafter, a pair of spaced embossments 46 are provided on the base 40 to extend downwardly therefrom, and an upwardly extending embossment 48 is provided on the arm 44 near the end thereof.

The fastening device 38 comprises a base 50 having an aperture 52 to enable it to be assembled onto the lower side of the table top, and a pair of relatively broad flat resilient arms 54 extending downwardly from opposite sides of the base. The arms 54 are provided with inwardly extending shoulders 56, and terminate in outwardly inclined camming portions 58.

Two pairs of fasteners 36 and 38 are assembled onto the lower side of the table top 12 for each leg 14, so that the fasteners of each pair are disposed in spaced relations on a line generally parallel to the adjacent side, with the fastener 36 of each pair being mounted so that the arm 44 extends generally in the direction of the other fastener 38. The angle between the lines joining the fasteners of each pair should be equal to the angle between the horizontal portions 24 and 26 of the legs.

The legs 14 may then be assembled onto the under side of the table top by inserting the ends of the horizontal portions 24 and 26 into the fasteners 36 so that the arms 44 enter the ends of the tubes (see Fig. 8). The embossments 46 on the base 40 facilitate alignment of the ends of the tubes. During this portion of the assembly operation, the embossment 48 on the arm provides a camming surface to allow the arm to pass easily into the end of the tube.

The horizontal portions 24 and 26 may then be swung upwardly toward the table top 80 so that they snap between the resilient arms 54 of the fasteners 38, with the shoulders 56 entering the apertures in the sides of the horizontal portions.

Thereafter, lengthwise movement of the horizontal portions is prevented by the end thereof abutting against the fastener 36, and by the shoulders 36 of the fasteners 38 abutting the abrupt edges 32 and 34 of the pairs of apertures 28 and 30.

The legs may be removed by forcing the bottom of the leg inwardly and downwardly until the horizontal portions become disengaged from the fasteners 38; however, horizontal inward forces on the bottom of the legs cannot cause the leg to become accidentally disengaged.

Since certain obvious changes may be made in the device without departing from the scope of the invention, it is intended that all matters contained herein be interpreted in an illustrative and not in a limiting sense.

I claim:

1. A furniture assembly, comprising a supported portion and a plurality of supporting legs, each of said legs being formed of tubular material and having a laterally extending upper end portion disposed on the under side of the supported portion with side apertures in the walls thereof in spaced relation to the end, and a pair of fastener members attached to the under side of the supported portion for retaining each leg in assembly thereon, one of said fastener members having means entering the end of the laterally extending portion of the leg, the other fastener having resilient means disposed in snapping engagement in the side apertures of the laterally extending portion of the leg in spaced relation to the end thereof.

2. A table assembly, comprising a supported table portion and a plurality of supporting legs assembled therewith, each leg comprising a pair of collateral tubular members, the upper ends of the tubes of each pair being bent to form laterally extending support portions disposed on the under side of the table portion, said laterally extending support portions of each pair of tubular members being disposed at an angle to each other, and having a pair of apertures on opposite sides thereof in spaced relation to the end, and fastener means disposed on the under side of the table portion retaining the legs in assembly thereon, said means comprising a resilient hook-like fastener entering the end of each of the laterally extending support portions and other fastener means having a pair of resilient arms disposed on opposite sides of the laterally extending support portions and having shoulders disposed in snapping engagement in said apertures.

References Cited in the file of this patent

UNITED STATES PATENTS

| Number | Name | Date |
|---|---|---|
| 627,432 | Mallory | June 20, 1899 |
| 1,560,913 | Johnson | Nov. 10, 1925 |
| 1,888,117 | Fox | Nov. 15, 1932 |
| 1,905,219 | Crichton | Apr. 25, 1933 |
| 1,931,695 | Hall | Oct. 24, 1933 |
| 2,043,886 | De Boer | June 9, 1936 |
| 2,079,648 | Aldeen et al. | May 11, 1937 |
| 2,208,486 | Aldeen | July 16, 1940 |
| 2,584,471 | Kohen | Feb. 5, 1952 |

FOREIGN PATENTS

| Number | Country | Date |
|---|---|---|
| 150,273 | Austria | July 26, 1937 |